(No Model.)

W. A. START.
EYEGLASS HOLDER.

No. 582,886. Patented May 18, 1897.

Witnesses:
H. B. Hallock
S. T. Williamson

Inventor:
William A. Start,
By Geo. H. Holgate
Attorney.

UNITED STATES PATENT OFFICE.

WILLIAM A. START, OF PHILADELPHIA, PENNSYLVANIA.

EYEGLASS-HOLDER.

SPECIFICATION forming part of Letters Patent No. 582,886, dated May 18, 1897.

Application filed August 13, 1896. Serial No. 602,584. (No model.)

*To all whom it may concern:*

Be it known that I, WILLIAM A. START, a citizen of the United States, residing at Philadelphia, in the county of Philadelphia and State of Pennsylvania, have invented certain new and useful Improvements in Eyeglass-Holders, of which the following is a specification.

My invention relates to a new and useful improvement in eyeglass-holders, and has for its object to provide a device of this description which may be quickly applied to a pair of eyeglasses or removed therefrom and when so applied will securely retain said glasses against being accidentally dropped after the manner of the ordinary method of securing glasses with an eye and a chain.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1:
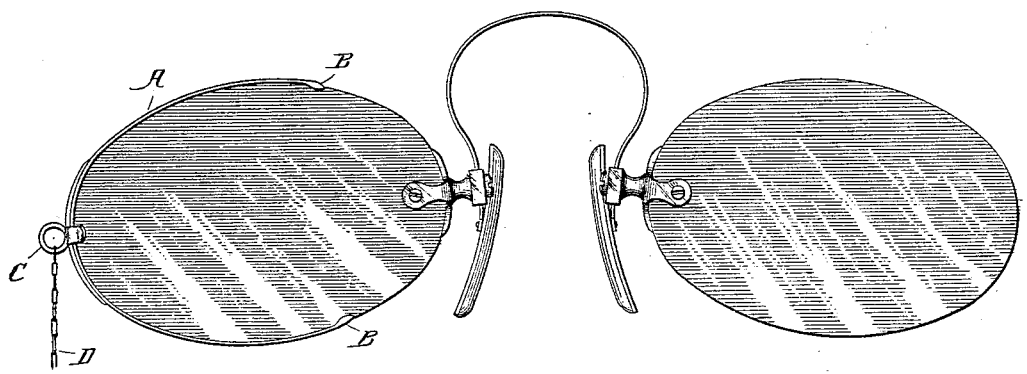
Figure 2:
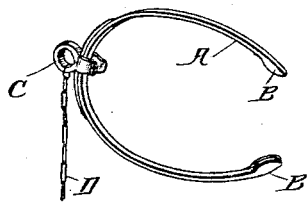

Figure 1 represents a pair of eyeglasses having my improvement applied thereto, and Fig. 2 a detailed perspective of my improvement before being applied.

In carrying out my invention I provide a thin strip of sheet metal or other suitable material having a certain amount of resiliency, and so cut and bend or mold the same as to produce a clip A, from which project the lugs B, so arranged as to guide the clip over the edge of one of the lenses of the glasses, as clearly shown in Fig. 1, and this clip carries an eye C, to which may be attached the end of a chain or cord D. Thus it will be seen that when the opposite end of this chain is secured to some portion of the wearing-apparel of a person and the clip is passed over the lens of the glasses the resiliency thereof will firmly clamp the lens, thereby preventing its withdrawal and thus securely holding the glasses to the chain or cord, in order that they may not be dropped. In practice the clip is made of such length and shape that its ends pass beyond the largest vertical diameter of the lens, and this will give said clip a firm hold upon said lens, since to withdraw the lens from the clip it will be necessary to exert sufficient pull thereon to spring the ends thereof outward.

The advantage of my improvement is that the glasses may not at all times be attached to the chain or cord, and when used indoors or when little movement is required may be used in the ordinary manner, and yet when necessity requires said glasses may be attached to the clip, which precludes the possibility of accident thereto, as will be readily understood.

Another advantage of my improvement is that the necessity for forming a hole in the lens of the glasses when it is necessary to attach the chain thereto is obviated, thereby preventing the weakening of said lenses, as well as improving their appearance.

Having thus fully described this invention, what I claim as new and useful is—

1. As a new article of manufacture, an eyeglass-holder, consisting of a clip of spring metal having lugs at its ends, said ends adapted to pass beyond the largest vertical diameter of the lens and an eye on the clip, substantially as described.

2. In combination with the lens of an eyeglass, a clip having lugs on its ends to guide the lens, said ends extending beyond the largest vertical diameter of the lens, substantially as described.

In testimony whereof I have hereunto affixed my signature in the presence of two subscribing witnesses.

WILLIAM A. START.

Witnesses:
 S. S. WILLIAMSON,
 MARK BUFORD.